US009845898B1

(12) United States Patent
Johnson et al.

(10) Patent No.: US 9,845,898 B1
(45) Date of Patent: Dec. 19, 2017

(54) MAGNETICALLY RETAINED RELIEF VALVE

(71) Applicant: The United States of America as Represented by the Administrator of the National Aeronautics and Space Administration, Washington, DC (US)

(72) Inventors: Wesley L. Johnson, Middleburg Heights, OH (US); Charles R. Cook, Gainesville, FL (US)

(73) Assignee: The United States of America as Represented by the Administrator of NASA, Washington, DC (US)

( * ) Notice: Subject to any disclaimer, the term of this patent is extended or adjusted under 35 U.S.C. 154(b) by 78 days.

(21) Appl. No.: 14/871,127

(22) Filed: Sep. 30, 2015

Related U.S. Application Data

(60) Provisional application No. 62/065,463, filed on Oct. 17, 2014.

(51) Int. Cl.
| | |
|---|---|
| *F16K 31/08* | (2006.01) |
| *F16K 11/06* | (2006.01) |
| *F16K 17/02* | (2006.01) |
| *F16K 27/04* | (2006.01) |

(52) U.S. Cl.
CPC ............ *F16K 31/084* (2013.01); *F16K 11/06* (2013.01); *F16K 17/02* (2013.01); *F16K 27/04* (2013.01)

(58) Field of Classification Search
CPC ........ F16K 31/084; F16K 17/02; F16K 11/06; F16K 27/04; F16K 99/0057; Y10T 137/87555; Y10T 137/7904; Y10T 137/7839; Y10T 137/7853; Y10T 137/7859; Y10T 137/7861
USPC ........ 251/65; 137/238, 212.1, 514.7, 516.11, 137/516.15, 601.2
See application file for complete search history.

(56) References Cited

U.S. PATENT DOCUMENTS

| | | | |
|---|---|---|---|
| 931,532 A * | 8/1909 | Wainwright | ........ F16K 17/0433 137/514.7 |
| 3,495,620 A * | 2/1970 | Seymour | ................. F16K 31/08 137/529 |
| 4,253,489 A | 3/1981 | Schleiter, Sr. | |
| 4,489,754 A | 12/1984 | Seessle et al. | |
| 7,225,830 B1 * | 6/2007 | Kershaw | ................. F16K 17/06 137/512.1 |
| 7,255,323 B1 | 8/2007 | Kadhim | |
| 7,506,663 B2 * | 3/2009 | Thomas | ................ F16K 15/023 137/529 |

* cited by examiner

*Primary Examiner* — Michael R Reid
(74) *Attorney, Agent, or Firm* — Jonathan J. Leahy; Michelle L. Ford; Mark P. Dvorscak

(57) ABSTRACT

A pressure relief valve includes a housing having a fluid inlet and at least one fluid outlet. A first structure mounted in the housing and fixed in relation thereto is in magnetic attraction with a second structure coupled to a piston disposed in a portion of the housing. The piston defines a chamber disposed adjacent to the fluid outlet(s) throughout the piston's stroke. The piston includes a sealing element providing a sealing force to prevent flow through the valve. The sealing force is independent of the magnetic attraction force between the first and second structures.

22 Claims, 4 Drawing Sheets

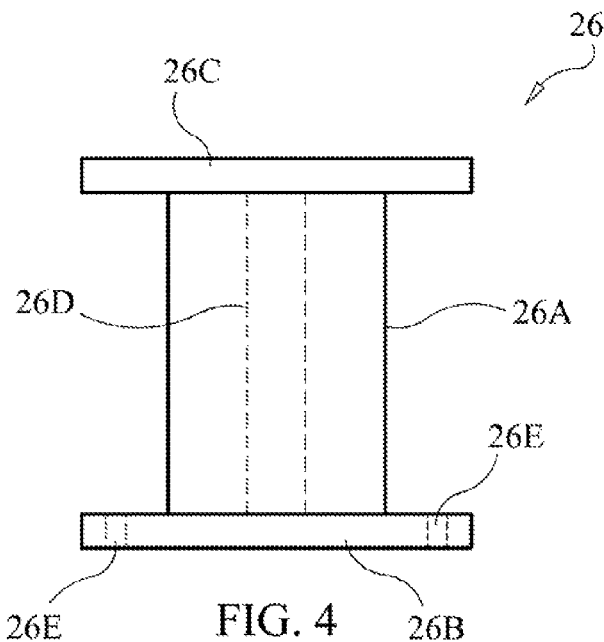
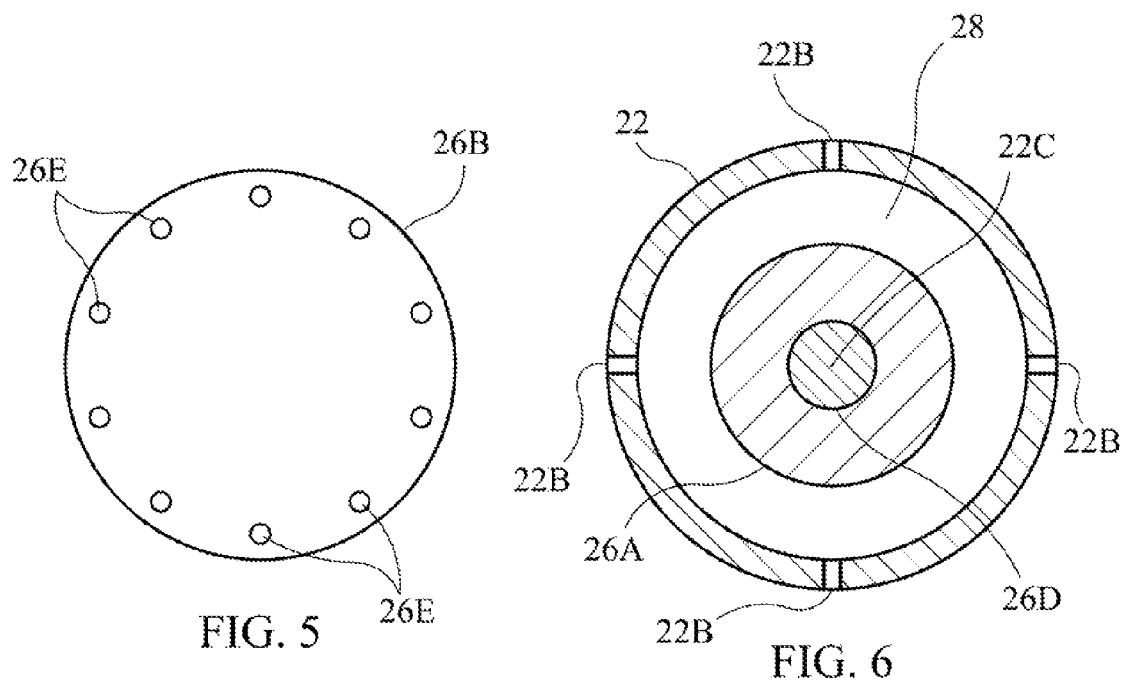

MAGNETICALLY RETAINED RELIEF VALVE

CROSS-REFERENCE TO RELATED PATENT APPLICATIONS

This application claims the benefit of priority under 35 U.S.C. §119(e) to U.S. Provisional Application Ser. No. 62/065,463, filed Oct. 17, 2014, the contents of which are incorporated herein by reference in their entirety.

ORIGIN OF THE INVENTION

The invention described herein was made in part by an employee of the United States Government and may be manufactured and used by or for the Government of the United States of America for governmental purposes without the payment of any royalties thereon or therefore.

BACKGROUND OF THE INVENTION

1. Field of the Invention

This invention relates to relief valves. More specifically, the invention is a relief valve using magnetic attraction to keep the valve closed until a specific condition occurs.

2. Description of the Related Art

A common type of relief valve is a pressure relief valve that opens upon detection of an overpressure condition. Typical pressure relief valves are maintained in a closed position using a spring that prevents the valve from opening prior to exposure to a certain overpressure. The spring's linear displacement is proportional to the force applied on the poppet. Thus, when the overpressure is first reached, the valve will open up or "crack" by a small amount to define a flow area that is generally less the full area of the relief valve orifice. That is, the relief valve increasingly opens until such time that the overpressure causes the valve to allow the rated flow through the valve. Additionally, most springs are susceptible to corrosion when left in fluid environments for too long. Over time, corrosion can change the crack pressure of the relief device and requires that the relief valve be serviced on a frequent basis.

SUMMARY OF THE INVENTION

Accordingly, it is an object of the present invention to provide a relief valve.

Another object of the present invention is to provide a relief valve that quickly transitions from closed to open once an overpressure condition exists.

Still another object of the present invention is to provide a relief valve that is less susceptible to corrosion.

Other objects and advantages of the present invention will become more obvious hereinafter in the specification and drawings.

In accordance with the present invention, a relief valve includes a housing having a fluid inlet and at least one fluid outlet. A first structure is mounted in the housing and fixed in relation thereto. The first structure defines a pathway having a first end and a second end with the first end being in fluid communication with the housing's fluid inlet. A piston is disposed in a portion of the housing for movement along a piston stroke. The piston defines a chamber disposed adjacent to the fluid outlet(s) throughout the piston's stroke. The piston includes a second structure having a magnetic attraction to the first structure. The piston further includes a face and a sealing element extending from the face for sealing the second end of the first structure's pathway when the piston is at one end of its piston stroke that is closest to the first structure. The magnetic attraction between the first and second structures retains the piston at the one end of its stroke. A flow path, defined through the piston's face and in fluid communication with the chamber, has a total area that is greater than a total area defined by the fluid outlet(s).

BRIEF DESCRIPTION OF THE DRAWING(S)

Other objects, features, and advantages of the present invention will become apparent upon reference to the following description of the preferred embodiments and to the drawings, wherein corresponding reference characters indicate corresponding parts throughout the several views of the drawings and wherein:

FIG. 4 is an isolated side view of a spool-type piston used in the embodiment illustrated in FIGS. 2 and 3;

FIG. 5 is a bottom view of the spool-type piston; and

FIG. 6 is a cross-sectional view of the relief valve taken along line 6-6 in FIG. 3.

DESCRIPTION OF THE PREFERRED EMBODIMENT(S)

Figure 1:
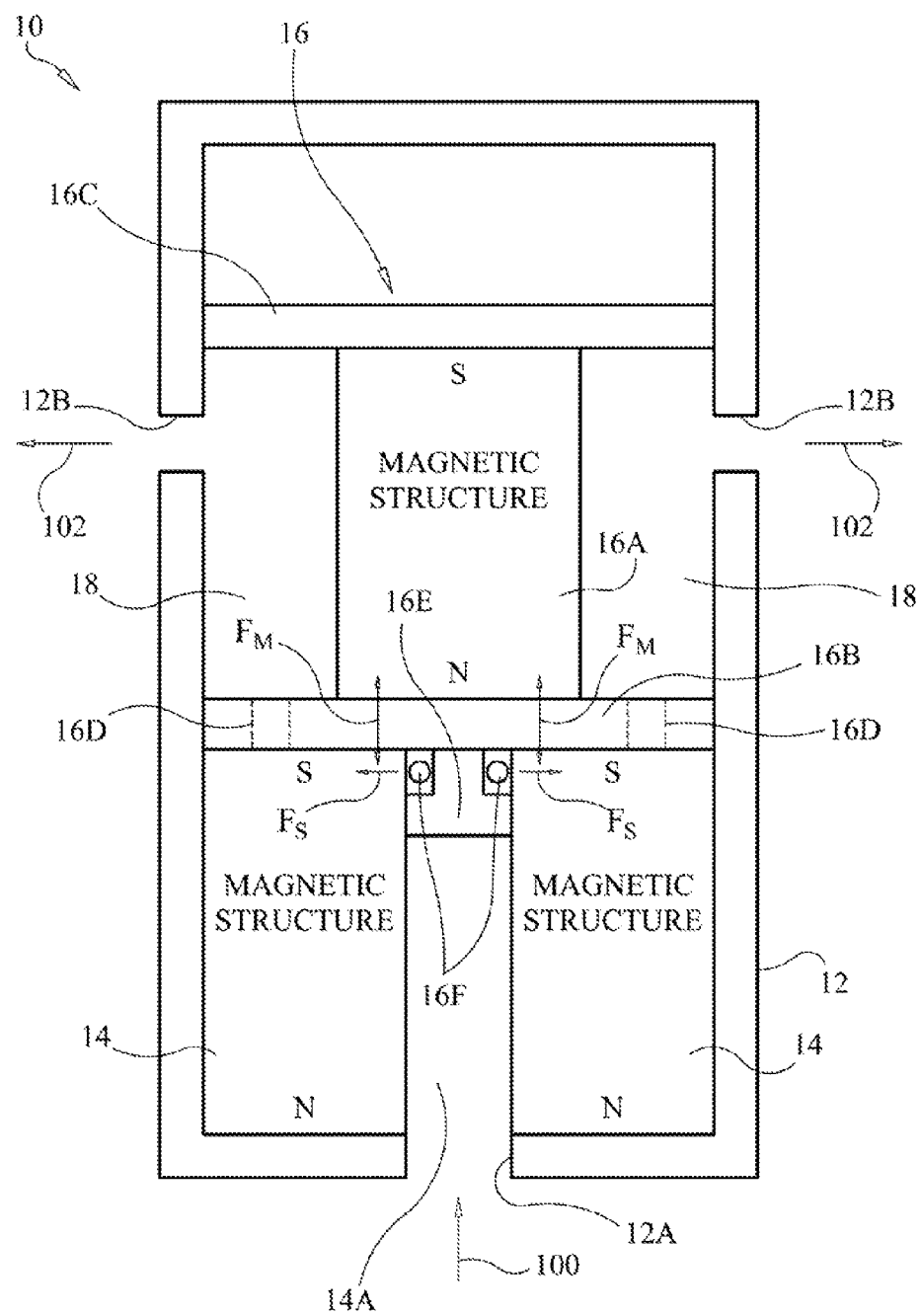
FIG. 1 is a schematic view of a relief valve using magnetic attraction forces to keep the valve closed in accordance with an embodiment of the present invention.

Referring now to the drawings and more particularly to FIG. 1, a schematic view of a relief valve using magnetic forces to keep the valve closed in accordance with an embodiment of the present invention is shown and is referenced generally by numeral 10. Valve 10 is illustrated in its closed position. Valve 10 can be used to relieve an unwanted condition in any of a variety of fluid (i.e., liquid or gas) containment device/apparatus or flow device/apparatus. In general, the fluid being "monitored" by valve 10 is indicated by arrow 100. By way of an illustrative example, it will be assumed herein that the condition being monitored is pressure. In the case of an overpressure condition, valve 10 opens and allows fluid 100 to pass through and escape therefrom as indicated by arrows 102.

Valve 10 includes a housing 12 having a fluid inlet 12A exposed to fluid 100, and one or more fluid outlets 12B for emitting fluid 102 when valve 10 is opened. For reasons that will be explained further below, the flow area defined by fluid inlet 12A must be greater than the total flow area defined by the one or more fluid outlets 12B. Fluid outlet(s) 12B can be vented directly to a surrounding environment or coupled to conduit(s) without departing from the scope of the present invention. Housing 12 can be made from any rigid and non-magnetic material.

Disposed and fixed within housing 12 is a magnetic structure 14 that defines a pathway 14A through the structure where one end of the pathway is in fluid communication with fluid inlet 12A. As will be explained further below, the other end of pathway 14A is sealed when valve 10 is closed and unsealed when valve 10 is opened, (i.e., an overpressure condition has occurred). Magnetic structure 14 can be realized by one or more permanent magnets or electromagnets whose magnetic poles are disposed at the opposing ends of pathway 14A. In the illustrated example, the north ("N") pole of magnetic structure 14 is positioned closest to fluid inlet 12A. However, it is to be understood that the south ("S") pole of magnetic structure 14 could be positioned closest to fluid inlet 12A without departing from the scope of the present invention.

Also disposed within housing 12 is a piston 16 capable of sliding movement within housing 12 to thereby define a piston stroke. In general, when valve 10 is closed as shown (i.e., the pressure of fluid 100 is less than an overpressure condition), piston 16 is at one end of its piston stroke closest to magnetic structure 14. Briefly, piston 16 is maintained at the (closed-valve) end of the piston's stroke by a magnetic attraction between magnetic structure 14 and a second magnetic structure coupled to piston 16. More specifically, piston 16 includes a magnetic structure 16A disposed between two spaced-part end faces 16B and 16C that define the sliding, piston-like fit within a portion of housing 12. That is, the combination of elements 16A-16C moves as one unit during the piston stroke of piston 16. Elements 16A-16C are configured to define a chamber 18 between housing 12 and piston 16 where chamber 18 is in fluid communication at all times with the one or more fluid outlets 12B. For example, chamber 18 can be an annular chamber encircling magnetic structure 16A.

Magnetic structures 14 and 16A can be realized by one or more permanent magnets or electromagnets whose magnetic poles are arranged such that there will be magnetic attraction between magnetic structures 14 and 16A. In the illustrated embodiment, the north ("N") pole of magnetic structure 16A is positioned for magnetic attraction to the south ("S") pole of magnetic structure 14. One of magnetic structures 14 and 16A could also be replaced by a material/structure that is attracted to a magnetic pull force.

End faces 16B and 16C are made from rigid and non-magnetic materials such that the magnetic attraction force between magnetic structure 14 and 16A is supported. End faces 16B and 16C define the opposing ends of chamber 18. End face 16B includes one or more through holes 16D that define a fluid communication path into chamber 18 when valve 10 is opened, but are sealed when valve 10 is in its (illustrated) closed position. To provide an unrestricted flow path past face 16B into chamber 18, the total flow area defined by the one or more through holes 16D must be greater than the total flow area defined by the one or more fluid outlets 12B.

Piston 16 also includes a poppet-like sealing element defined by a plug 16E coupled to and extending from end face 16B, and an annular seal 16F (e.g., one or more o-rings) fitted on plug 16E. In general, when magnetic structures 14 and 16A exhibit magnetic attraction, pathway 14A is sealed to fluid 100. That is, annular seal 16F closes/seals pathway 14A when valve 10 is closed. The seal can be formed directly with a portion of magnetic structure 14 or with a portion of housing 12 if housing 12 was designed to form part of or an extension of pathway 14A. However, in all cases the sealing forces ("$F_S$") supplied by seal 16F is independent of and perpendicular to the magnetic attraction force ("$F_M$") between magnetic structures 14 and 16A. When pathway 14A is sealed, there can be no fluid flow through holes 16D into chamber 18. In general and as will be explained below, the sealing force $F_S$ is designed to be larger than the magnetic force $F_M$.

As is known in the art, the attraction force ("F") (e.g., the attraction force $F_M$ referenced above) between magnets is inversely proportional to the square of the distance ("d") between the magnets or $F \propto 1/d^2$. For valve 10, this means that the attraction force $F_M$ will rapidly decrease with any increase in the axial spacing between magnetic structures 14 and 16A. Accordingly, at the onset of an overpressure condition for fluid 100, piston 16 will begin to slide in housing 12 thereby causing a rapid decrease in magnetic attraction force $F_M$. In this way, when sealing force $F_S$ is overcome by the overpressure condition of fluid 100, magnetic attraction force $F_M$ is already negligible such that piston 16 moves away from magnetic structure 14 as pathway 14A fully opens. When this occurs, fluid 100 flows through pathway 14A and is free to pass through holes 16D into chamber 18. As described above, the total flow area of fluid outlets 12B is less than the total flow area of holes 16D. That is, the flow of fluid 100 entering chamber 18 is choked or restricted at fluid outlets 12B as the total pressure is reduced across outlets 12B. By choking/restricting fluid flow 102 exiting an opened valve 10, the dynamic pressure in chamber 18 keeps magnetic structures 14 and 16A separated. That is, there are no lifting/drag forces acting on plug 16E since the total pressure in chamber 18 is equal to that at inlet 12A as all of piston 16 up to end face 16C is immersed in the pressure of fluid 100. When the pressure of fluid 100 decreases at inlet 12A to a level that is less than the overpressure condition, piston 16 returns to its original "valve closed" position.

Figure 2:
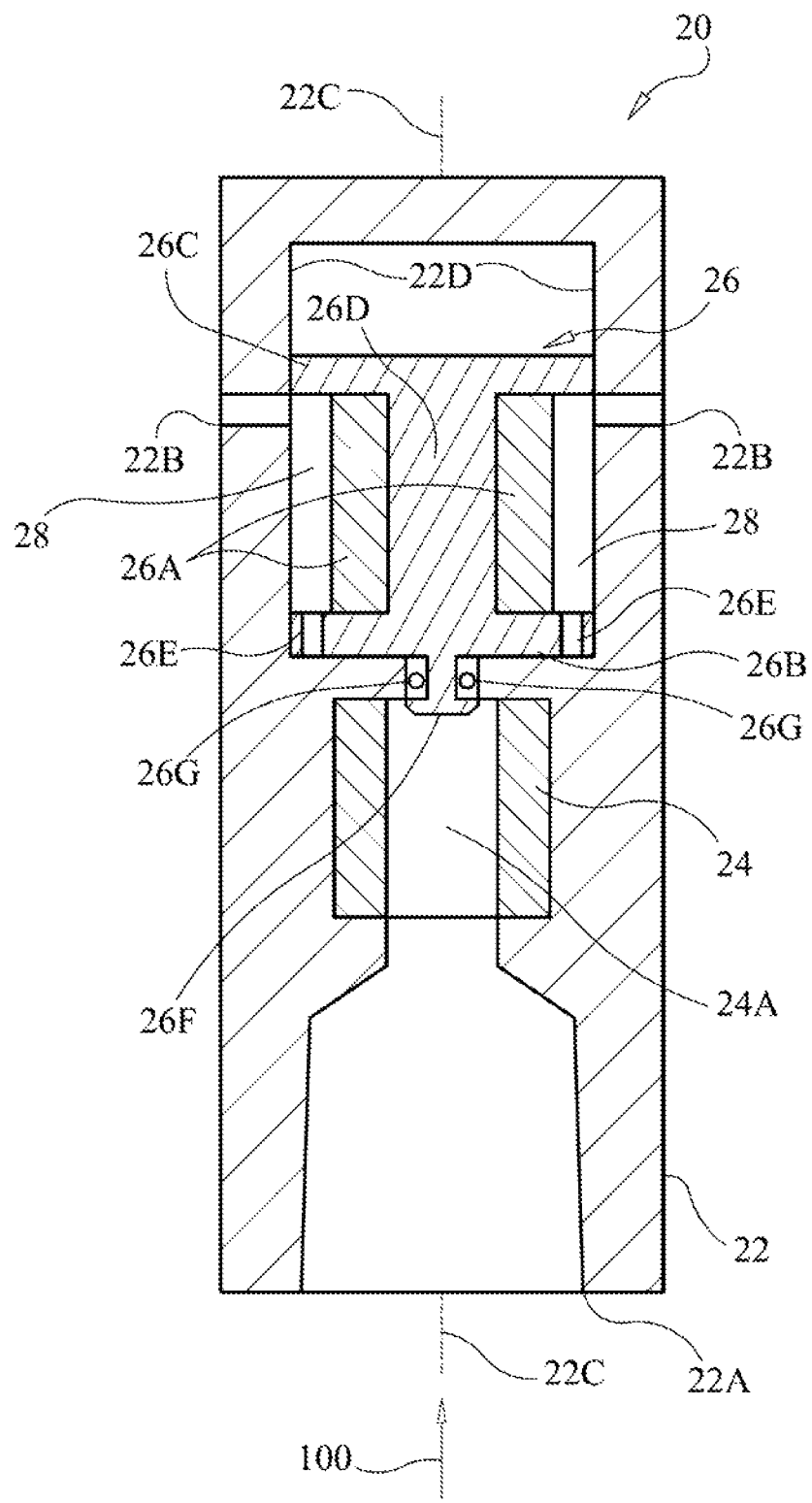
FIG. 2 is a cross-sectional view of a magnetically retained relief valve in its closed position in accordance with another embodiment of the present invention.
Figure 3:
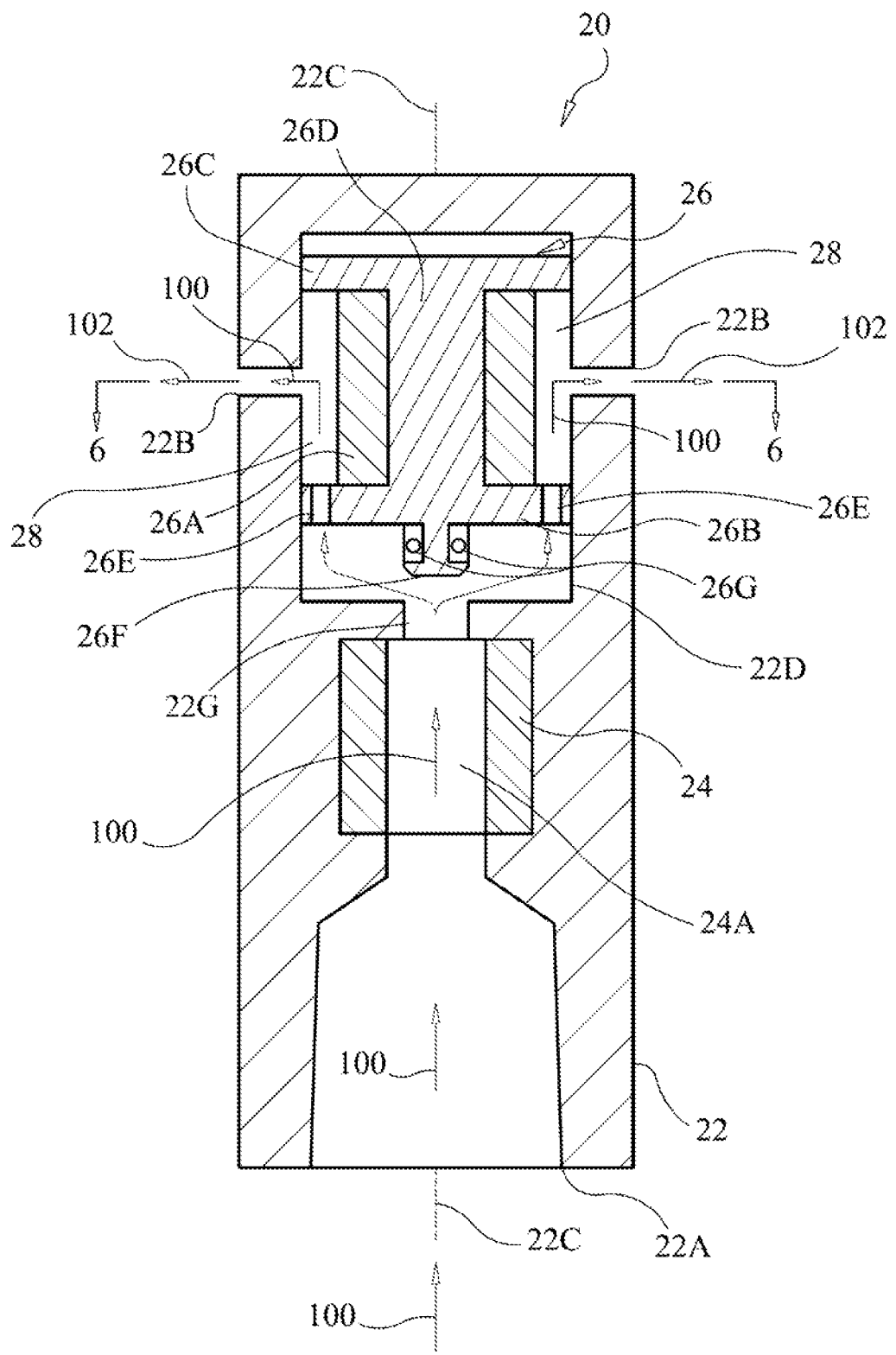
FIG. 3 is a cross-sectional view of the relief valve in FIG. 2 in its open position.

The relief valve of the present invention can be constructed in a variety of ways without departing from the scope of the present invention. By way of a non-limiting example, one such construction will be shown and described with the aid of FIGS. 2-6 where the entire valve is referenced generally by numeral 20. Valve 20 is shown in its closed position (FIG. 2) and its open position (FIG. 3). Various features of valve 20 will be described with the aid of FIGS. 4-6. It will be assumed for purposes of description that valve 20 is a pressure relief valve and that valve 20 is constructed in accordance with the same principles described above for valve 10. Accordingly, these principles will not be repeated for valve 20.

Valve 20 includes a rigid and non-magnetic housing 22 having a fluid inlet 22A and a plurality of fluid outlets 22B distributed evenly about the periphery of housing 22 as best seen in FIG. 6. The number of fluid outlets 22B is not a limitation of the present invention. Housing 22 defines a longitudinal axis 22C that also defines the longitudinal axis of valve 20. Disposed and fixed within housing 22 is a hollow, open-ended cylindrical magnet 24 such that a pathway 24A aligns with longitudinal axis 22C and is in fluid communication with fluid inlet 22A. A piston 26 is slidable within a piston cylinder 22D defined within housing 22 and aligned with longitudinal axis 22C. Referring additionally to FIGS. 4 and 5 where piston 26 is shown in isolation, piston 26 defines a spool-like structure that supports a hollow, open-ended cylindrical magnet 26A between two end faces 26B and 26C that are joined by a longitudinal core 26D passing through the central portion of magnet 26A. The diameters of end faces 26B and 26C are such that they form a sliding fit within piston cylinder 22D, while the outside diameter of magnet 26A is smaller than that of faces 26B/26C such that an annular chamber 28 is defined between magnet 26A and housing 22 adjacent to fluid outlets 22B. Magnets 24 and 26A are positioned to magnetically attract with the magnetic attraction force being parallel to longitudinal axis 22C. Similar to valve 10, end face 26B has through holes 26E and has a poppet-like sealing element defined by a plug 26F and an annular seal 26G whose sealing force is independently applied in a direction perpendicular to longitudinal axis 22C. The number of holes 26E is not a limitation of the present invention.

The operating principles of valve 20 are identical to those of valve 10 described above. Accordingly, when an overpressure condition of fluid 100 is reached, piston 26 slides in piston cylinder 22D until plug 26F and seal(s) 26G are no longer in contact with housing (shown as 22G) thereby allowing fluid 100 to flow through valve 20 as shown in FIG. 3. That is, fluid 100 moves through fluid inlet 22A, along pathway 24A, through holes 26E, into chamber 28, and out fluid outlets 22B. The above-described choked flow through valve 20 can be aided by creating a tortious flow path through the valve. For example, the flow paths defined by fluid outlets 22B passing through the walls of housing 22 can be perpendicular (or approximately so) to longitudinal axis 22C of housing 22 so that the flow of fluid 100 must turn before exiting housing 22.

The advantages of the present invention are numerous. The pressure relief valve quickly transitions from closed to open without the use of any springs. The valve can be readily adapted to a variety of applications by changing the type and/or size of the magnetic structures, spacing between magnetic structures, and/or the size of the fluid inlet and outlet(s). The independence between the valve's sealing force and magnetic attraction (closing) force allows the valve to be easily designed to be 100% open at an overpressure condition. The choked flow through the valve keeps the valve fully opened until the overpressure condition has abated, and allows the valve to reclose when the overpressure condition has abated.

Although the invention has been described relative to a specific embodiment thereof, there are numerous variations and modifications that will be readily apparent to those skilled in the art in light of the above teachings. For example, if one or both of the magnetic structures described herein were realized by an electromagnet, the valve could also be opened/closed on demand simply by turning the electromagnet off (to open the valve) and on (to close the valve). Further, the valve can incorporate magnetic shielding to protect it from any external magnetic field influence. Dampers could also be included to slow the piston's valve opening/closing movement. Additionally or alternatively, accelerators (e.g., springs) could be included to speed up the piston's valve opening/closing movement. The valve could be constructed to have its magnets exposed to or isolated from the fluid without departing from the scope of the present invention. It is therefore to be understood that, within the scope of the appended claims, the invention may be practiced other than as specifically described.

Although the present invention has been disclosed in terms of a preferred embodiment, it will be understood that numerous additional modifications and variations could be made thereto without departing from the scope of the invention as defined by the following claims:

We claim:

1. A relief valve, comprising:
   a housing having a fluid inlet and at least one fluid outlet, said fluid inlet having an inlet flow area, said at least one fluid outlet having a total outlet flow area, said inlet flow area being greater than said total outlet flow area, said housing adapted to support a fluid flow under pressure moving between said fluid inlet and said at least one fluid outlet;
   a first structure mounted in said housing and fixed in relation thereto, said first structure defining a pathway having a first end and a second end, said first end being in fluid communication with said fluid inlet of said housing; and
   a piston disposed in a portion of said housing for movement along a piston stroke, said piston defining a chamber disposed adjacent to said at least one fluid outlet throughout said piston stroke, said piston including a second structure having a magnetic attraction to said first structure, said piston including a face and a sealing element extending from said face for sealing said second end of said pathway when said piston is at one end of said piston stroke closest to said first structure wherein said magnetic attraction retains said piston at said one end of said piston stroke, said piston defining a flow path through said face in fluid communication with said chamber, wherein a total area defined by said flow path is greater than said total outlet flow area of said at least one fluid outlet, and wherein the fluid flow is restricted by said at least one fluid outlet when said magnetic attraction no longer retains said piston at said one end of said piston stroke.

2. A relief valve as in claim 1, wherein each of said first structure and said second structure comprises a hollow cylindrical magnet.

3. A relief valve as in claim 1, wherein each of said first structure and said second structure is selected from the group consisting of permanent magnets and electromagnets.

4. A relief valve as in claim 1, wherein said at least one fluid outlet comprises a plurality of fluid outlets distributed about said housing.

5. A relief valve as in claim 1, wherein said fluid inlet and said pathway are aligned along a longitudinal axis of said housing, and wherein said at least one fluid outlet defines a corresponding at least one outlet pathway aligned perpendicular to said longitudinal axis.

6. A relief valve as in claim 5, wherein said chamber encircles said longitudinal axis.

7. A relief valve as in claim 5, wherein said at least one fluid outlet comprises a plurality of fluid outlets distributed evenly about said housing.

8. A relief valve as in claim 1, wherein said fluid inlet and said pathway are aligned along a longitudinal axis of said housing, wherein a magnetic force associated with said magnetic attraction is parallel to said longitudinal axis, and wherein a sealing force associated with said sealing element sealing said second end of said pathway is perpendicular to said longitudinal axis.

9. A relief valve, comprising:
   a housing having a fluid inlet and a plurality of fluid outlets;
   a first magnet mounted in said housing and fixed in relation thereto, said first magnet being a hollow open-ended cylindrical magnet defining a pathway having a first end and a second end, said first end being in fluid communication with said fluid inlet of said housing;
   a piston disposed in a portion of said housing for movement along a piston stroke, said piston defining a chamber disposed adjacent to said fluid outlets throughout said piston stroke, said piston including a face and a sealing element extending from said face for sealing said second end of said pathway when said piston is at one end of said piston stroke closest to said first magnet, said piston including holes in said face that are in fluid communication with said chamber, wherein a total area defined by said holes is greater than a total area defined by said fluid outlets; and a second magnet coupled to said piston for movement therewith, said second magnet arranged to be in magnetic attraction to said first magnet, wherein said magnetic attraction retains said piston at said one end of said piston stroke.

10. A relief valve as in claim 9, wherein said second magnet comprises a cylindrical magnet.

11. A relief valve as in claim 9, wherein each of said first magnet and said second magnet is selected from the group consisting of permanent magnets and electromagnets.

12. A relief valve as in claim 9, wherein said fluid outlets are distributed evenly about said housing.

13. A relief valve as in claim 9, wherein said fluid inlet and said pathway are aligned along a longitudinal axis of said housing, and wherein said fluid outlets define corresponding outlet pathways aligned perpendicular to said longitudinal axis.

14. A relief valve as in claim 13, wherein said chamber encircles said longitudinal axis.

15. A relief valve as in claim 9, wherein said fluid inlet and said pathway are aligned along a longitudinal axis of said housing, wherein a magnetic force associated with said magnetic attraction is parallel to said longitudinal axis, and wherein a sealing force associated with said sealing element sealing said second end of said pathway is perpendicular to said longitudinal axis.

16. A relief valve, comprising:
a housing having a fluid inlet and at least one fluid outlet;
a first magnetic structure mounted in said housing and fixed in relation thereto, said first magnetic structure defining a fluid pathway having a first end and a second end, said first end being in fluid communication with said fluid inlet of said housing;
a spool-shaped piston having a first end face, a second end face, and a longitudinal core spanning between and coupled to said first end face and said second end face, said first end face and said second end face sized for sliding engagement with a portion of said housing along a piston stroke wherein an annular chamber is defined between said longitudinal core and said housing, said annular chamber disposed adjacent to said at least one fluid outlet throughout said piston stroke, said first end face having through holes in fluid communication with said chamber wherein a total area defined by said through holes is greater than a total area defined by said at least one fluid outlet;
a sealing element extending from said first end face for sealing said second end of said fluid pathway when said piston is at one end of said piston stroke closest to said first magnetic structure; and
a second magnetic structure coupled to said piston and arranged to be in magnetic attraction to said first magnetic structure wherein said magnetic attraction retains said piston at said one end of said piston stroke.

17. A relief valve as in claim 16, wherein each of said first magnetic structure and said second magnetic structure comprises a hollow cylindrical magnet.

18. A relief valve as in claim 16, wherein each of said first magnetic structure and said second magnetic structure is selected from the group consisting of permanent magnets and electromagnets.

19. A relief valve as in claim 16, wherein said at least one fluid outlet comprises a plurality of fluid outlets distributed about said housing.

20. A relief valve as in claim 16, wherein said fluid inlet and said fluid pathway are aligned along a longitudinal axis of said housing, and wherein said at least one fluid outlet defines a corresponding at least one outlet pathway aligned perpendicular to said longitudinal axis.

21. A relief valve as in claim 16, wherein said at least one fluid outlet comprises a plurality of fluid outlets distributed evenly about said housing.

22. A relief valve as in claim 16, wherein said fluid inlet and said fluid pathway are aligned along a longitudinal axis of said housing, wherein a magnetic force associated with said magnetic attraction is parallel to said longitudinal axis, and wherein a sealing force associated with said sealing element sealing said second end of said fluid pathway is perpendicular to said longitudinal axis.

* * * * *